United States Patent [19]

Torii et al.

[11] Patent Number: 5,057,763
[45] Date of Patent: Oct. 15, 1991

[54] HIGH POWER SUPPLY FOR MOTOR VEHICLE

[75] Inventors: Koshi Torii, Iwakura; Seiji Hayashi, Oobu; Shigenori Sonobe, Toyota; Shigeru Senoo, Ichikawa, all of Japan

[73] Assignee: Nippondenso Co., Ltd., Kariya, Japan

[21] Appl. No.: 408,186

[22] Filed: Sep. 11, 1989

[30] Foreign Application Priority Data

Sep. 12, 1988 [JP] Japan .................. 63-228127

[51] Int. Cl.⁵ .......................................... H02J 7/14
[52] U.S. Cl. .................................. 322/8; 322/29; 219/203
[58] Field of Search ............... 322/7, 8, 37, 97, 29, 322/90; 219/203, 219, 522, 547

[56] References Cited

U.S. PATENT DOCUMENTS

| | | | |
|---|---|---|---|
| 3,928,748 | 12/1975 | Sauer | 219/203 X |
| 4,084,126 | 4/1978 | Clements | 322/8 |
| 4,267,433 | 5/1981 | Sahm, III | 322/6 X |
| 4,277,672 | 7/1981 | Jones | 219/219 X |
| 4,451,776 | 5/1984 | Iwaki et al. | 32/29 X |
| 4,459,489 | 7/1984 | Kirk et al. | 322/8 X |
| 4,539,466 | 9/1985 | Yamamoto | 219/547 X |
| 4,673,797 | 6/1987 | Weirick | 219/203 |
| 4,730,097 | 3/1988 | Campbell et al. | 322/7 X |
| 4,862,055 | 8/1989 | Maruyama et al. | 219/203 X |
| 4,866,365 | 9/1989 | Offiler et al. | 322/8 |

Primary Examiner—Steven L. Stephan
Assistant Examiner—Kristine Peckman
Attorney, Agent, or Firm—Cushman, Darby & Cushman

[57] ABSTRACT

A high power supply apparatus employs a high-power load such as a deicing means for deicing a windshield of the automobile. The high-power load is connected to a converter which connects the output voltage of the alternator to a predetermined voltage. During the operation of the high-power load, the alternator is disconnected from the battery through a switch, and at the same time, the rotating speed of the alternator is increased by the idle speed controller. Since the high-converter means converts the output voltage of the alternator when the rotating speed of the alternator is increased, a predetermined electric power of the alternator is supplied to the high-power load.

7 Claims, 2 Drawing Sheets

HIGH POWER SUPPLY FOR MOTOR VEHICLE

FIELD OF THE INVENTION

The present invention relates to a high power supply apparatus of motor vehicle, and more precisely relates to a high power supply having an alternator which can charge a battery while supplying high voltage to a high voltage load such as a windshield deicer.

BACKGROUND OF THE INVENTION

Recently, a deicer provided on a windshield of a motor vehicle or a rear window thereof requires a high amount of electric power to melt frozen ice or snow on the windshield or the rear window.

The output voltage of an alternator becomes a high voltage which is converted by a voltage converter. The high voltage is supplied to a deicer. This system is disclosed in the Japanese Laid Open No. 63-68444.

In the above-mentioned prior art, however, since a rectifier of the alternator is always connected to a battery, the output voltage of the alternator is maintained at 14.5[V].

Accordingly, as shown in FIG. 2, the output electric power of the alternator is not greatly; increased, even if a rotating speed of the alternator is increased.

Since the alternator requires a high electric power of as much as 1500 W to operate the electric conductor, however, a capacity of the alternator must be larger to generate the high electric power.

SUMMARY OF THE INVENTION

The present invention has an object to solve the disadvantage of the conventional type apparatus. The object of the present invention is to supply the predetermined output electric power to the high voltage load without changing the size of the alternator. A further object of the present invention is to charge the battery even while the high-power load is operated.

In order to attain the above objects, the apparatus of the invention includes a high-power load connected to a high-converter means. During the operation of the high-power load, the alternator is disconnected from the battery by a switch and the alternator is driven to rotate faster by the idle speed controller. This causes the alternator to generate a high voltage, which is higher than the battery voltage.

In a more specific aspect of the invention, the apparatus employs a low-converter means for converting the output voltage of the alternator or the output voltage of the high-converter means to a predetermined voltage which is lower than the output voltage in order to charge the battery during an operation of the high-power load.

DETAIL DESCRIPTION OF THE PREFERRED EMBODIMENT

Figure 1:
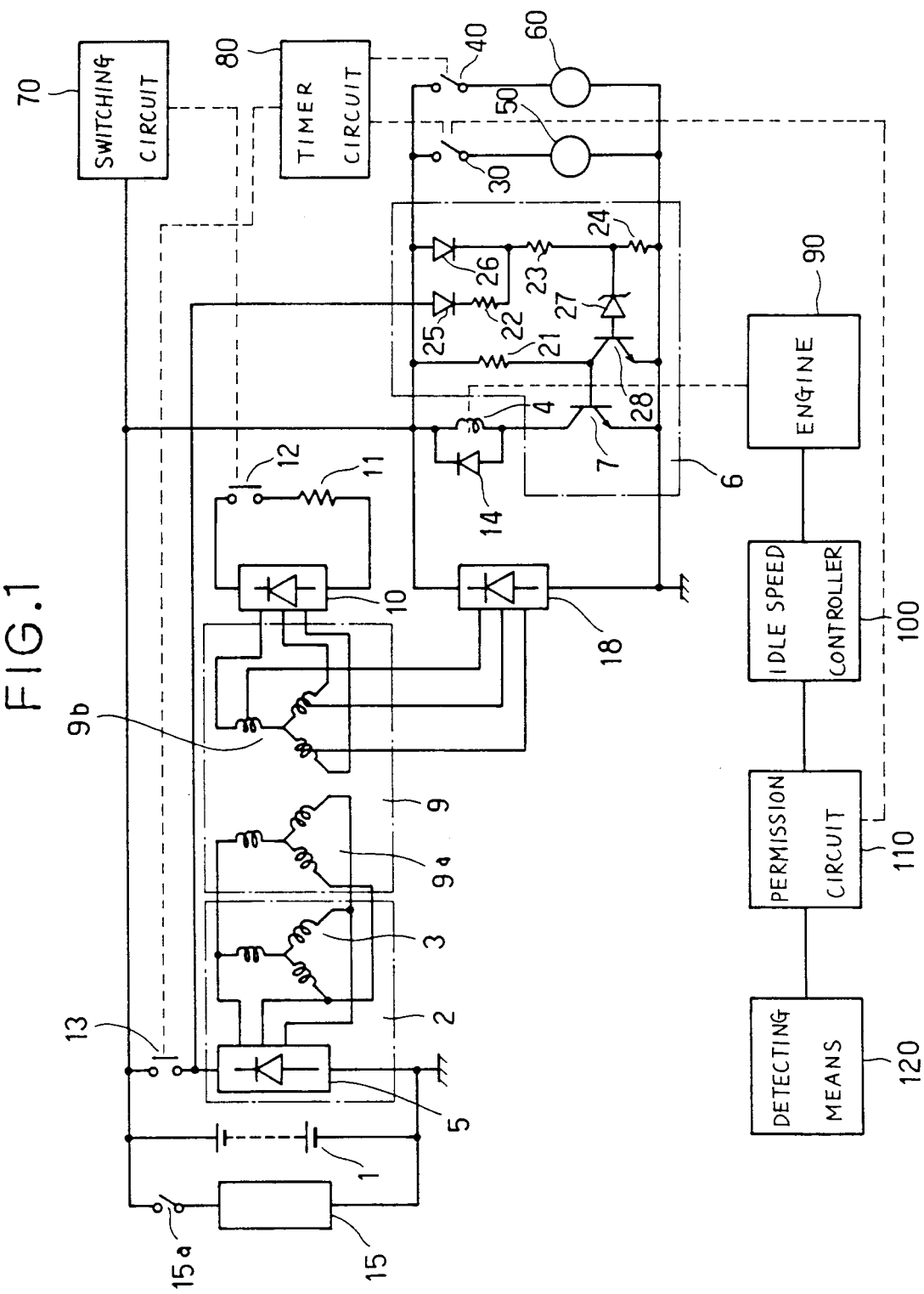
FIG. 1 is a schematic block diagram of an electric circuit according to the present invention.

Numeral 1 designates a battery. Numeral 2 designates an alternator of an automobile vehicle having a stator coil 3 by which an alternating current is generated, a rotor coil 4 which is provided on a rotor, and a full wave rectifier 5 which rectifies the alternating current generated by the stator coil 3.

A voltage regulating circuit 6 has an output transistor 7 which controls the current generated by the rotor coil 4 in order to maintain the battery voltage within the range of the predetermined value.

A voltage converter 9 includes a primary winding 9a connected to the stator coil 3 and a secondary winding 9b. A first rectifier 10 rectifies an output power of the secondary winding 9b, and is connected to a high-power load 11 through a first switch 12. A high-power load 11 is a transparent resistance deposited on the windshield. A second switch 13 is connected between the full-wave rectifier 5 of the alternator 2 and the battery 1. A diode 14 is in parallel with the rotor coil 4.

An electrical load 15, such as a headlight, is connected to the battery 1 through a switch 15a.

A second rectifier 18 has one end connected to the battery 1 and rectifies a AC voltage which is outputted from an intermediate tap of the second winding 9b.

The voltage regulating circuit 6 includes a collector of the transistor 28 connected to a base of the output transistor 7, a zener diode 27 connected to a base of the transistor 28, diodes 25, 26, and resistors 21 to 24.

When a manual switch 30 is closed, power from rectifier 18 is supplied to relay coil 50 thus energizing the relay coil and closing contacts 12.

Similarly, when a manual switch 40 is closed, relay coil 60 is energized and contacts 13 are closed.

A timer circuit 80 is operative to open the second contacts 13 automatically after a predetermined time (e.g. 5 minutes) has elapsed from the time when the driver operates the manual switch 30.

An internal combustion engine 90 drives the alternator 2 via a belt.

An idle speed controller 100 controls the rotating speed of the engine. A detecting means 120 for detecting a stop of the automobile is operative to the idle speed controller 100.

The full-wave rectifier 5 of the alternator 2 is usually connected to the battery 1, when the second switch 13 is closed and the first switch 12 is open. When these switches are so operated, the battery voltage is coupled to the voltage regulating circuit 6, and the voltage regulating circuit 6 controls the current generated by the rotor coil 4 in order to maintain the battery voltage at 14.5 [V] in such a manner that the operation of the output transistor 7 is controlled.

It is sometimes necessary in an automobile vehicle to electrically energize the high-power load 11 when the windshield is frozen. The driver turns on the manual switches 30 and 40 in order to supply current to the high-power load 11. The detecting means 120 outputs a signal when the vehicle transmission is in a neutral state.

When the permission circuit 110 receives both the neutral indicative signal of the detecting means 120 and the signal which indicates the switch 30 is open, the signal of the permission circuit 110 is sent to the idle speed controller 100.

The idle speed controller 100 increases the rotating speed of the alternator 2 to 3000 [rpm] in accordance with an increase of the rotating speed of the engine 90.

The resistance of the high-power load 11 is about 3 ohms for the area of the windshield and this requires an electric power of 1500 W in order to deice an ice thickness of about 1 mm deposited on the windshield within 2-3 minutes. In order to do this, a voltage of about 70 V is required to be supplied to the high-power load 11.

An electric power of about 400 W is required to the battery 1 from the second rectifier 18 connected to the second winding 9b of the voltage converter 9.

In other words, the alternator 2 should generate an electric power of about 1900 W in order to supply both the high-power load 11 and the battery 1.

Figure 2:
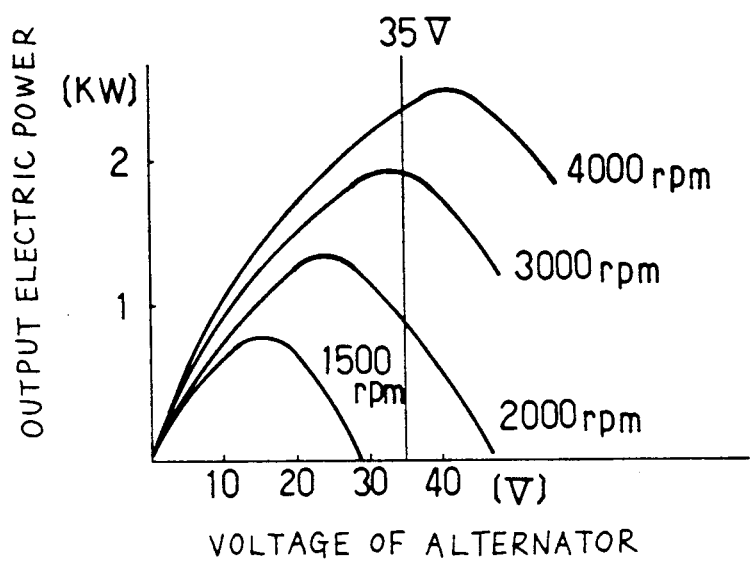
FIG. 2 is a graph showing the relationship between the rotating speed of the alternator and the output electric power.

As shown in FIG. 2, the rotating speed of the alternator 2 needs to be increased to as high as 3000 rpm in order to generate output electric power of 1900 W.

It is understood that the rotating speed of the alternator 2 should be increased in order to supply the output electric power which is higher than the electric power necessary, which is determined by adding both the electrical power for supplying the high-power load and for supplying the battery.

Accordingly, as shown in FIG. 2, the output voltage of 35 V is generated from the alternator 2, since the rotating speed of the alternator 2 is 3000 rpm.

The ratio of primary turns to secondary turns is 2, because the voltage supplied to the high-power load 11 is required to be 70 V while the alternator 2 generates the output voltage of 35 V.

The second rectifier 18 is connected to the intermediate tap of the second winding 9b in such a manner that the output voltage of the second winding 9b is 14.5 V when the output voltage of the second winding 9b is 70 V, because the battery 1 is maintained at 14.5 V by the voltage regulating circuit 6 while the battery 1 is charged from the output voltage of the second rectifier 18.

Accordingly, the second winding 9b of the voltage converter 9 outputs 70 V, while the output voltage of the battery 1 is maintained at 14.5 V by the voltage regulating circuit 6.

Since a high voltage of 70 V is supplied to the high-power load 11, the ice deposited on the windshield can be melted.

The timer circuit 80 is operative to automatically turn off the switch 40 after the predetermined time (e.g. 5 minutes), when the driver forgets to turn off the switch 40.

When the driver turns on the switch 40 and thus turns on the second switch 13, the alternator 2 is connected to the battery 1.

Since the alternator 2 generates the output voltage of 14.5 V, the voltage of 29 V (14.5/35*70) is supplied to the high-power load 11 while the switch 12 remains turned on. Accordingly, since the windshield is heated and is kept warm, the melting ice is prevented to freeze again, or to collect moisture.

In the present invention, since the alternator 2 generates the predetermined voltage at the time when the alternator outputs the maximum power, the size of the alternator can be reduced. Since the idle speed of the engine does not need to be raised a lot, it is more efficient since the gas mileage is reduced and the noise of the engine is reduced.

Voltage detecting circuit 70 detects the voltage of the battery 1 is decreased below the second predetermined voltage while the high electric power is supplied to the high-power load 11, the voltage detecting circuit 70 is operative to turn off the first manual switch 12. Accordingly, since all output power of 1900 W is supplied to the battery 1, the voltage of the battery 1 is recovered rapidly. Since the second manual switch 12 turns on by the voltage detecting circuit 70 after the voltage of the battery 1 is recovered, the output of 1500 W is supplied to the high-power load 11 as soon as possible.

DC/DC converter can be used as means for converting the output voltage of 35 V to 70 V instead of the voltage converter 9.

The second rectifier 18 may be connected to an intermediate tap of the stator coil 3 in order to charge the battery 1. Also, a voltage divider may be connected to the stator coil 3 or the second winding 9b of the voltage converter 9 in such a manner that the output voltage of the voltage divider is supplied to the battery 1 at 14.5 V.

The voltage regulating circuit 6 may control the current generated by the rotor coil 4 in order to maintain the output voltage of the second winding 9b at 70 V in the case that the voltage regulating circuit 6 detects directly the second winding voltage of the voltage converter 9. Also, the regulating circuit 6 may detect directly the output voltage of the stator coil 3 in order to maintain the output voltage of the stator coil 3 at 35 V.

It is to be noted that the foregoing embodiments of the invention are disclosed for purposes of illustration only and are not intended to limit the invention. As will be appreciated by those skilled in the art, various alternations to the illustrated embodiments may be made without departing from the spirit and scope of the invention.

What is claimed is:

1. A high power supply apparatus comprising:
   an alternator driven by an internal combustion engine and including a stator coil producing an AC output voltage, a rotor coil and a rectifier for rectifying the AC output voltage of said stator coil,
   a battery connected to said rectifier to be charged by an output of said rectifier,
   high-voltage converter means for converting the output voltage of said stator coil to a high voltage higher than a voltage of said battery,
   a high-power load connected to said high-voltage converter means to receive said high voltage of said high-voltage converter means,
   a first switch electrically connected between said high-voltage converter means and said high-power load in such a manner that said high-voltage converter means is connected to said high-power load by closing said first switch and disconnected by opening said first switch,
   a second switch electrically connected between said rectifier of said alternator and said battery in such a manner that a connection between said rectifier and said battery is disconnected by opening said second switch, and
   an idle speed controller for raising a rotating speed of said engine in order to raise a rotating speed of said alternator when said first switch turns on,
   wherein said high-voltage converter means converts the output voltage of said alternator when the rotating speed of said alternator is raised by said idle speed controller to cause said alternator to output substantially a maximum output electric power.

2. A high-power supply apparatus claimed in claim 1, further comprising:
   low-voltage converter means responsive to said high-power load being connected to said high-voltage converter means through said first switch for converting one of the output voltage of said alternator and said high voltage of said high-converter means to a predetermined voltage which is lower than said output voltage of said alternator, in order to charge said battery.

3. A high-power supply apparatus claimed in claim 2, wherein:

said idle speed controller includes means for raising the rotating speed of said engine in such a manner that said maximum output electric power of said alternator is higher than an electric power supplied to both said high-power load and said battery.

4. A high-power supply apparatus comprising:

an alternator driven by an internal combustion engine and including a stator coil producing an AC output, a rotor coil, and a rectifier for rectifying the AC output of said stator coil, a battery connected to said rectifier to be charged by an output of said rectifier, a switching means connected between said rotor coil and said battery, a voltage regulating means for controlling a current generated by said rotor coil through said switching means in order to maintain a voltage of said battery at a first predetermined voltage, high-voltage converter means for converting the output of said stator coil to a second predetermined voltage which is higher than said first predetermined voltage and outputting said second predetermined voltage, a high-power load connected to said high-voltage converter means and operated by said second predetermined voltage, a switch for electrically disconnecting said rectifier from said battery when said second predetermined voltage of said high-voltage converter means is supplied to said high-power load, an idle speed controller for increasing the rotating speed of said engine in order to increase the rotating speed of said alternator when said second predetermined voltage of said high-voltage converter means is supplied to said high-power load, and low-voltage converter means for converting said second predetermined voltage of said high-voltage converter means to said first predetermined voltage in order to charge said battery when said second predetermined voltage of said high-voltage converter means is supplied to said high-power load.

5. A high-power supply apparatus claimed in claim 4, wherein:

said high-converter means converts the output voltage of said alternator when the rotating speed of said alternator is increased by said idle speed controller and said alternator outputs substantially a maximum output electric power.

6. A high-power supply apparatus claimed in claim 5, wherein:

said high-converter means includes a transformer including a primary winding connected to said stator coil and a secondary winding connected to said high-power load, and said low-converter means includes a rectifier connected to both said battery and an intermediate tap of said secondary winding in order to generate said first predetermined voltage.

7. A high-power supply apparatus claimed in claim 4, further comprising:

a second switch electrically connected between said high-voltage converter means and said high-power load, and means for disconnecting said high-voltage converter means from said high-power load by controlling said second switch when the battery voltage is decreased below a third predetermined voltage which is lower than said first predetermined voltage.

* * * * *